Feb. 7, 1939.　　　C. H. GRANT　　　2,146,014
VARIABLE CAMBER WING
Filed May 6, 1936　　　2 Sheets-Sheet 1

INVENTOR
Charles H. Grant
BY
Frederick W. Barker
ATTORNEY

Feb. 7, 1939.   C. H. GRANT   2,146,014
VARIABLE CAMBER WING
Filed May 6, 1936   2 Sheets—Sheet 2

INVENTOR
Charles H. Grant
BY
Frederick W. Barker
ATTORNEY

Patented Feb. 7, 1939

2,146,014

UNITED STATES PATENT OFFICE 2,146,014

VARIABLE CAMBER WING

Charles H. Grant, New Rochelle, N. Y.

Application May 6, 1936, Serial No. 78,159

14 Claims. (Cl. 244—42)

This invention relates to airplanes and my improvement is directed to the control members of an airplane, known as flaps and ailerons, and their means of operation.

Fundamentally my invention comprises an airfoil or wing whose portion forward of the rear spar may be rigid but whose rearward portion is articular or composed of a series of spanwise panels which are pivotally supported from the rear spar.

Also my invention includes the provision of a pivotal master lever, constituting main control means, operable from the pilot's cockpit and carrying pivotal members or links which respectively engage the several panels for their operation in movements, in different degree, to describe arcs of increasing downward curvature.

It is one of the purposes of my invention that the entire rear spanwise portion of the wing shall be articular and capable of functioning as a flap, and shall be operable in curvilinear manner, to avoid the abrupt deformation which results in the operation of conventional flaps.

Another purpose is to render spanwise sections or members of the rear wing portion operable separately from the main rear wing portion that they may function as ailerons without affecting any set attitude of the remaining rear wing portion.

Further my invention comprehends the pivotal interconnection of the members or panels which comprise the wing rear portion in such wise that as the series of panels is subjected to downward flexure spaces will be opened up between adjacent panels, tending to prevent burbling and to promote an unbroken air flow over the wing surface, thereby increasing the lift and wing efficiency.

Other features and advantages of my invention will hereinafter appear.

In the drawings:—

Fig. 5 is an enlarged cross-sectional view showing the rear spar and part of the mechanism for operating the articular panels, and Fig. 6 is a top plan view, in section, of Fig. 5.

Figure 1:
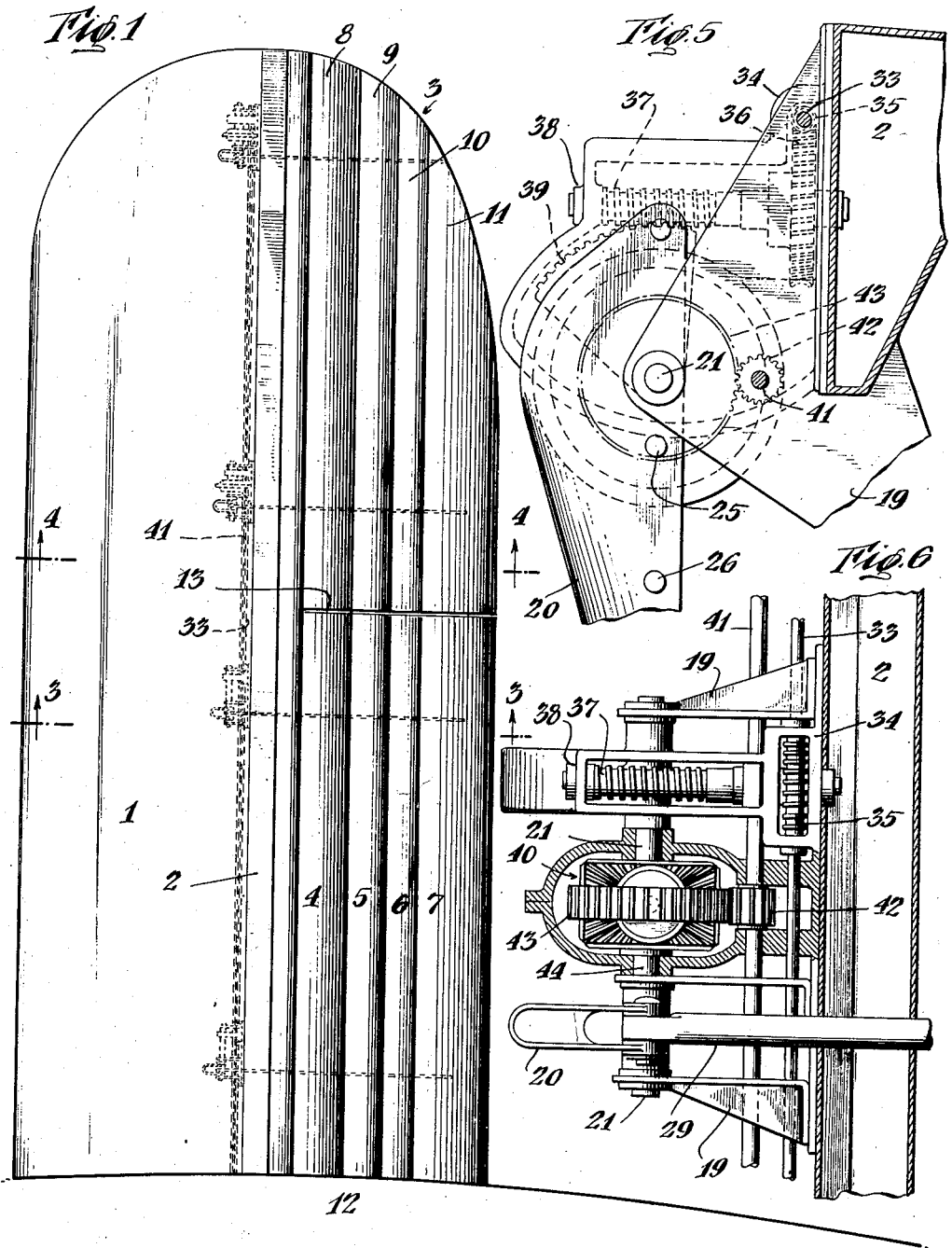
Figure 1 is a top plan view showing a portion of an airplane wing embodying my invention.
Figure 2:
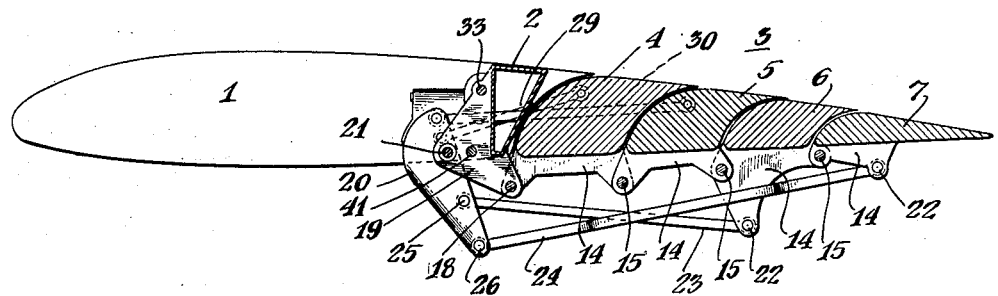
Fig. 2 is a side elevation, partly in section, of an airplane wing whereof the rearward portion has the articular form of my improvement in normal flying attitude.
Figure 3:
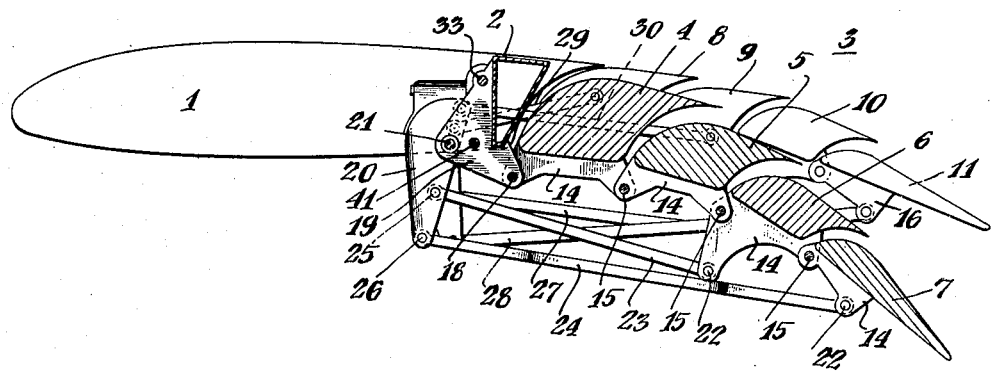
Fig. 3 is a similar view, partly in section on the line 3—3 of Fig. 1, showing the flap and aileron sections as depressed in different degrees of curvature.
Figure 4:
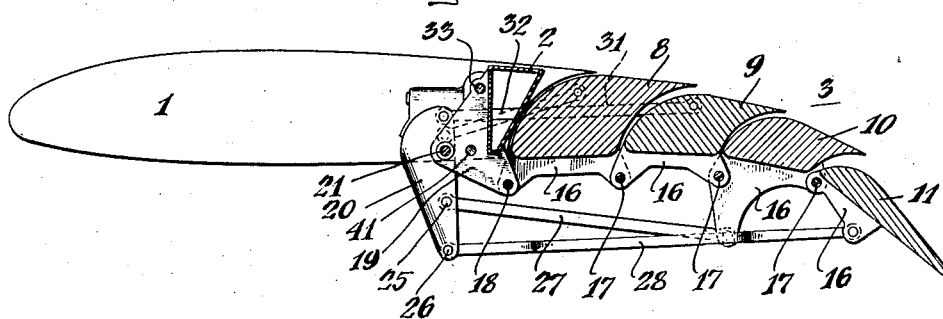
Fig. 4 is a similar view, partly in section on the line 4—4 of Fig. 1, showing the aileron section as depressed.

In said drawings let 1 indicate that portion of a wing forward of the rear spar 2, while 3 indicates generally the rear articular portion.

Said articular portion is here shown as composed of the flap panels 4, 5, 6, 7 and the aileron panels 8, 9, 10, 11.

The flap panels are shown as extended spanwise from near the central body or fuselage 12 to a point, indicated at 13 where the series of aileron panels, which constitute the tip portion of the wing, have their beginning. It will be understood that while the series of flap and aileron panels together comprise the entire rear portion of the wing, said series are separated at the point 13, so that, while it is contemplated in certain phases of usefulness, that both series shall move together, also the aileron series is capable of simultaneous movement independently of the flap series, for lateral control purposes.

At intervals along the panels 4, 5, 6 and 7 they are provided with pendent lugs 14 and pivots 15 which connect adjacent lugs to thereby render the panels capable of relative movement while hingedly uniting the series of panels. Also the aileron panels 8, 9, 10 and 11 are similarly provided with pendent lugs 16, connected by pivots 17, so that these panels too are hingedly united.

The lugs of the rearmost panels, 4 and 8, are connected by pivots 18 respectively with brackets 19 that are secured to the spar 2.

For the control of the series of panels in their flexure I provide master levers 20 which are journalled at 21 in the brackets 19, and which are pivotally linked to the respective panels. Thus, the lugs 14 for panels 6 and 7 are respectively pivoted at 22 to links 23, 24, and said links are respectively pivoted at 25, 26 to lever 20. It will be noted that the links 24 are pivoted to lever 20 at more distant points thereon than links 23 so that the arc of movement accorded panel 7 in the operation of lever 20 is greater than that of panel 6.

Correspondingly the linkage 27, 28 for panels 10, 11 has like pivotal connection with lever 20. In the example illustrated the links 23, 24 and the links 27, 28 have their pivotal connection with lever 20 below the fulcrum to give greater movement to the panels 5 and 9 than that imparted to panels 4 and 8. Panels 4 and 5 are connected by linkage 29 and 30 with the lever 20, whilst panels 8 and 9 are connected by linkage 31 and 32 to said lever 20, and it will be noted their pivotal connections with said lever 20 are above the fulcrum of the latter. When the series of panels are flexed downwardly the lever actuated panels 4, 5, 8, 9 are given a thrust motion and panels 6, 7, 10, 11 are given a pull motion, as is obvious.

As means for operating both series of panels when used as a flap I employ a shaft 33 that is rotatable in bearings such as are indicated at 34 and is actuable by suitable means (not shown) from the pilot's cockpit. Said shaft carries the worm thread 35 that is in mesh with a worm gear 36, said worm gear being carried by a worm shaft 37 which is journalled in a bracket 38 extended from spar 2. Worm shaft 37 engages a toothed sector 39 which is mounted on shaft 21 for the operation of lever 20 through the medium of the differential 40. For actuating the ailerons I employ a shaft 41 which carries a spur gear 42, said gear engaging an external gear 43 mounted on one side of the differential and through said differential 40 it actuates a shaft 44 which carries the main or master lever 20.

By means of the mechanisms described the pilot, through actuating means of usual character (not shown), is able to rotate either the shaft 33, to control all the panels as a flap; or, by rotating the shaft 41 thereby causing the operation of only the panels 8, 9, 10, 11 in the performance of their function as ailerons.

It is to be understood that while I have designated the panels 4, 5, 6 and 7 as flap panels, and the panels 8, 9, 10, 11 as aileron panels, yet in practice all of these panels are operable together in performing the function of a flap, and only the panels 8, 9, 10, 11 are intended to function as ailerons.

Variations within the spirit and scope of my invention are equally comprehended by the foregoing disclosure.

I claim:—

1. An aircraft wing comprising a rigid portion and a series of pivotally interconnected members one member thereof being pivotally connected to said rigid portion at one end of the series, there being slots between each member and said rigid portion that open when said members are deflected downwardly, said series forming the trailing edge of the wing, single main control means for said series carried solely by said rigid portion, and individual means intermediate said main control means and the respective members of said series to move said members different degrees, said individual means being directly connected to said control means and said interconnected members.

2. An aircraft wing comprising a rigid portion and a series of pivotally interconnected members one member thereof being pivotally connected to said rigid portion at one end of the series, there being slots between each member and said rigid portion that open when said members are deflected downwardly, said series forming the trailing edge of the wing, single main control means for said series carried solely by said rigid portion, individual means intermediate said main control means and the respective members of said series to move said members different degrees, said individual means being directly connected to said control means and said interconnected members, and means for operating said control means.

3. An aircraft wing comprising a rigid portion and a series of pivotally interconnected members one member thereof being pivotally connected to said rigid portion at one end of the series, there being slots between each member and said rigid portion that open when said members are deflected downwardly, said series forming the trailing edge of the wing, single main control means for said series carried solely by said rigid portion, individual means intermediate said main control means and the respective members of said series to move said members different degrees, said individual means being directly connected to said control means and said interconnected members, and means for operating said main control means, said operating means including means for holding said means and said individual members in a set position.

4. An aircraft wing comprising a rigid portion and a series of pivotally interconnected members that are each free to rotate, the pivotal connection of each of said members being below the bottom surface of the airfoil, main control means for said series carried by said rigid portion, and individual means intermediate said main control means and the respective members of said series to move said members in different degrees, said members in normal flying attitude of the wing, presenting a substantially continuous surface, but adapted in flexure to open up spaces for air flow between adjacent members, said spaces varying in extent in accordance with the degree of flexure accorded the series.

5. An aircraft wing comprising a rigid portion and a series of pivotally interconnected members that are each free to rotate, the pivotal connection of each of said members being below the bottom surface of the airfoil, main control means for said series carried by said rigid portion, actuating means for said main control means, and individual means intermediate said series and the respective members of said series to move said members different degrees, said members being all operable as a flap.

6. An aircraft wing comprising a rigid portion and a plurality of series of pivotally interconnected members that are each free to rotate, and positioned at the trailing edge of the wing, main control means for said series carried by said rigid portion, actuating means for said main control means, individual means intermediate said series and the respective members of said series to move said members different degrees, said individual means comprising links connected directly to said control means and said interconnected members, and other actuating means susceptible of operating one series as an aileron.

7. An aircraft wing comprising a rigid portion, flap members and aileron members pivotally connected with said rigid portion, means for operating said flap and aileron members and positioned below their pivotal connections, and differential actuating means for said flap members and aileron members whereby said members may be operated to function unitedly as a flap while permitting said aileron members to function as ailerons.

8. In combination with the rigid portion of an aircraft wing, a series of pivotally connected members free to rotate, there being slots between each member which open when said members are deflected downwardly, an individual control for each one of said members, all of the individual control means connecting each one of said members being connected to a single control means for moving the same.

9. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, single main control means for said series carried solely by said rigid portion, and means connecting individually each interconnected pivotal member to the single main control means to move said members different degrees.

10. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, main control means for said series and being operatively positioned in advance of the rear longitudinal edge of said rigid portion and individual means intermediate said series and the respective members thereof to move said members different degrees.

11. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, main control means for said series carried solely by said rigid portion and individual means intermediate said main control means and the respective members of said series to move said members different degrees, at least one of said individual means being positioned above the pivotal connections of said interconnected members.

12. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, main control means for said series carried solely by said rigid portion and individual means intermediate said main control means and the respective members of said series to move said members different degrees, said individual means including links, at least one of which is positioned between the upper and lower surfaces of the airfoil.

13. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, main control means for said series carried solely by said rigid portion and individual means intermediate said main control means and the respective members of said series to move said members different degrees, at least one of said individual means being positioned below the pivotal connections of said interconnected members.

14. An aircraft wing comprising a rigid portion and a series of pivotally interconnected members that are each free to rotate, one member thereof being pivotally connected to said rigid portion at one end of the series, there being slots between each member and said rigid portion that open when said members are deflected downwardly, said series forming the trailing edge of the wing, main control means for said series carried solely by said rig'd portion, actuating means for said main control means, and individual means intermediate said series and the respective members of said series to move said members different degrees, said members being all operable as a flap.

CHARLES H. GRANT.